May 25, 1937. F. J. T. BARNES 2,081,131
MEANS FOR USE WITH DRAWING-OFF LIQUIDS FROM CONTAINERS
Filed Dec. 7, 1934  2 Sheets-Sheet 1

Inventor
F. J. T. Barnes.
By Stone, Boyden & Mash
Attorneys.

May 25, 1937.    F. J. T. BARNES    2,081,131
MEANS FOR USE WITH DRAWING-OFF LIQUIDS FROM CONTAINERS
Filed Dec. 7, 1934    2 Sheets-Sheet 2

Inventor
F. J. T. Barnes
By Stone, Boyden & Mack
Attorneys

Patented May 25, 1937

2,081,131

UNITED STATES PATENT OFFICE 2,081,131

MEANS FOR USE WITH DRAWING-OFF LIQUIDS FROM CONTAINERS

Frederick John Trevallon Barnes, Brisbane, Queensland, Australia

Application December 7, 1934, Serial No. 756,553
In Great Britain December 8, 1933

9 Claims. (Cl. 217—113)

This invention relates to means for use when drawing-off liquids from containers, and an object of the invention is to provide an improved arrangement whereby the liquid may be drawn off without waste. The invention is particularly applicable to the drawing-off of beer from barrels, and enables this to be effected without loss of beer, gas or air and without the necessity of "tapping" the barrel in the usual manner.

It is an object of the invention to provide a bushing for insertion in the bung hole of a container which will form a fluid-tight joint between the walls thereof and the stem of a tap, extractor, or other device to be inserted in the bushing for the purpose of drawing off the contents of the container.

It is another object of the invention to provide a bushing which will form a fluid tight seal between the stem of an extractor, tap or the like and the walls of a bung hole into which it is inserted, the tightness of the seal being resistant to, and in fact improved by, the outward pressure of the fluid contents of the container.

A further object of the invention is to provide a rubber bushing adapted to be seated within a metal lining mounted within the bung hole of the container to form a fluid-tight seal between said lining and a stem, for instance the stem of a tap or an extractor, inserted through said bushing for the purpose of withdrawing the contents of said container.

Still another object of the invention is to provide such a bushing in which means are provided for locking the bushing against expulsion thereof from its surrounding metal lining, and/or for preventing longitudinal movement of said bushing relative to the stem inserted therein.

Still another object of the invention is to provide in combination with such a bushing means for holding a stem or the like inserted through same in engagement with said container, whereby expulsion of said stem under the action of pressure from within the container is prevented.

The accompanying drawings show, by way of example only, several constructions according to the invention.

Figure 1:
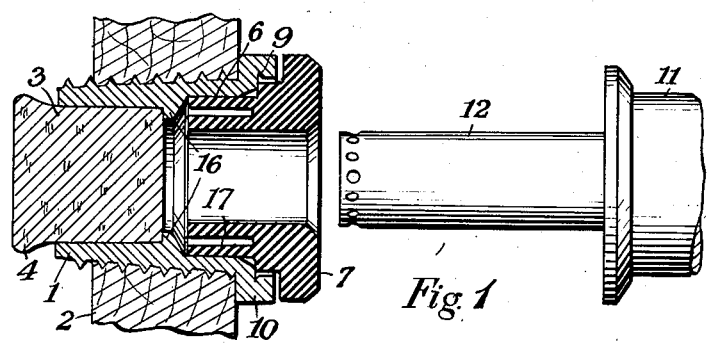
Figures 1 and 2 are cross-sectional views of two constructions showing the metallic bushing engaged within the bung hole of the container, and the extension or stem of the fitting in its position prior to insertion.

Referring to the drawings and more particularly to Figure 1, a metallic bushing 1 is screw-threaded into the container 2 and the innermost portion 3 of the bore is closed by a cork 4. An annular rib 16 divides the bore into two portions and the outermost portion 6 contains a rubber bushing 7, the outer end of the bore 6 being provided with a bevelled portion 8 to facilitate insertion of the rubber bushing 7. An under-cut recess 9 is formed in the head 10 of the metallic bushing and is adapted to receive a metallic or like seal to prevent the ingress of dirt or other foreign matter, that is to say when the container is normally closed by the cork 4 and prior to the insertion of the rubber bushing 7. A tap, the body portion of which is indicated by 11, comprises an extension 12 which is adapted to be inserted through the rubber bushing 7 to engage the cork 4, thereby removing the cork from the bore 3 and pushing it into the container. During this operation leakage of liquid (for example, beer,) gas or air is prevented due to the tight joint which is provided between the bore of the rubber bushing 7 and the extension 12 of the tap.

According to the invention, the body portion of the rubber bushing 7 is provided with a deep annular recess 17 extending from the inner face of the said bushing and longitudinally thereof. Apart from facilitating the insertion of the rubber bushing, the provision of the annular recess 17 assists in providing a liquid, gas or air tight joint between the extension 12 of the tap and the bore 6 of the metallic bushing, in that the liquid, gas or air pressure within the recess 17 causes expansion of the body portion of the rubber bushing and presses it tightly against the bore 6 and the extension 12.

Figure 2:
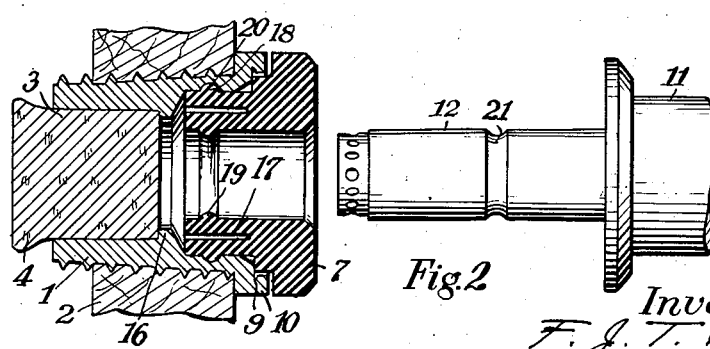

Figure 2 relates to a similar construction to that according to Figure 1 but the inner and outer portions of the body portion of the rubber bushing 7 are provided with circular ribs 18 and 19. The rib 18 is adapted to engage a corresponding recess 20 in the bore of the metallic bushing, and the rib 19 is adapted to engage a corresponding recess 21 in the extension 12 of the tap. Due to the provision of these ribs and recesses, the rubber bushing 7 is "keyed" to the metallic bushing 1 and the extension 12, thereby holding the tap in position.

Figure 3:
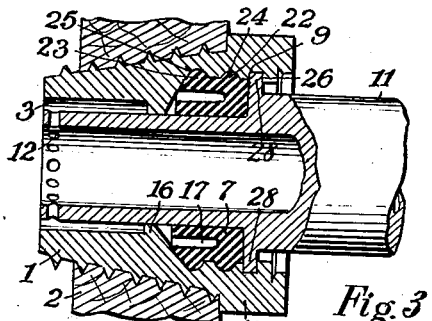
Figure 3 is a cross-section and Figure 4 is a side elevational view of a construction in which the fitting is secured within the bore of the metallic bushing.
Figure 4:
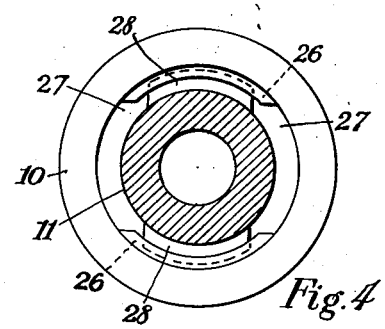

Referring to Figures 3 and 4, the rubber bushing 7 is provided with two circumferential ribs 22, 23 which are adapted to engage recesses 24 and 25 in the bore of the metallic bushing 1. In addition, a longitudinal outward movement of the extension 12 of the fitting after it has reached its innermost position is prevented by the provision of separate securing means, constituted by a recess 26 provided in the bore 6 of the metallic bushing, which recess is provided with cut-away portions 27 allowing passage of lugs 28 formed on the extension 12 of the tap. After the lugs have passed through the cut-away portions 27 the fitting is rotated through say, 90° and the lugs 28 are then disposed within the recess 26, thereby preventing outward longitudinal movement of the fitting due to the action of pressure within the container.

Figure 5:
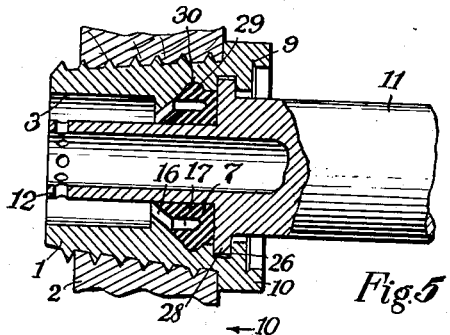
Figures 5 and 6 are similar views to Figures 3 and 4 but embody a modified form of rubber bushing.
Figure 6:
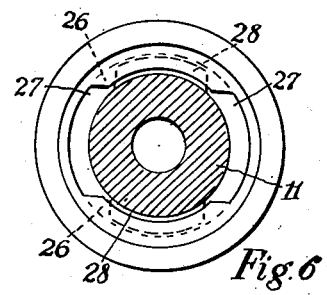

Figures 5 and 6 show similar securing means to that according to Figures 3 and 4 but the rubber bushing 7 is provided with only one circumferential rib 29 which engages a corresponding recess 30 in the bore 6 of the metallic bushing.

Figure 7:
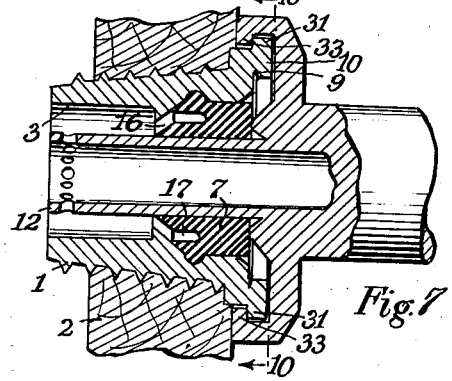
Figure 7 is a cross-sectional view of a further construction and showing a modified arrangement for securing the fitting within the bore of the metallic bushing.
Figure 8:
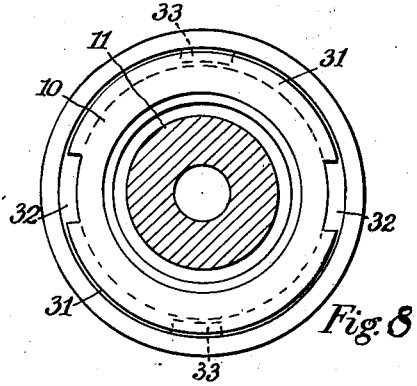
Figure 8 is a cross-sectional view on the line 18—18 of Figure 7.

Figures 7 and 8 show a modified form of securing means and in this construction a circumferential flange 31 is provided on the head 10 of the metallic bushing, which flange is provided with cut-away portions 32. Recessed lugs 33 are formed on the extension 12 of the tap, and when the fitting reaches its innermost position, the recessed lugs 33 are adapted to pass through the cut-away portions 32. The tap is then rotated through, say, 90° to cause the recessed lugs 33 to engage the flange 31 thereby preventing outward longitudinal movement of the fitting from its innermost position.

It will, of course, be understood that with the arrangements shown in the drawings, the rubber bushing 7 may be carried by the extension 12 of the tap instead of being initially inserted into the bore 6 of the metallic bushing, the rubber bushing then acting in a similar manner to provide a liquid, air or gas tight joint.

Finally, it will be understood that the invention is applicable to all types of fittings which are provided with an extension or stem which is adapted to engage the cork disposed within the innermost portion of the bore of the metallic bushing. For example, the invention may be applied to an extractor for say drawing-off beer with air, $CO_2$ or other suitable gas, the metallic bushing and its associated parts being, in this case, disposed vertically in the container.

I claim:

1. A bushing of resilient material for insertion in the bung hole of a container, comprising a tubular sleeve portion which is provided with a deep longitudinal annular recess within the thickness of the wall of said sleeve extending in the axial direction from one end of said sleeve.

2. A bushing for insertion within the bung hole of a container, comprising a flange portion and a tubular sleeve extending therefrom, said sleeve portion comprising an annular slot within the thickness of the wall of the sleeve, extending in the axial direction from the end of the sleeve opposite from the flange.

3. Resilient bushing for insertion within the bung hole of a container, comprising a flange portion, a sleeve extending therefrom, a continuous bore extending through said sleeve and said flange portion and a recess within the thickness of said sleeve portion, concentric with said bore, and extending into said sleeve in the longitudinal direction thereof.

4. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a groove in said outer bore and a rib on said resilient bush engaging in said groove.

5. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a groove in said outer bore and a rib on said resilient bush engaging in said groove, a second rib on said resilient bush projecting into the bore thereof and adapted to engage a groove in the stem of a drawing-off device to be inserted through said bush.

6. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a plurality of grooves in said outer bore and a plurality of ribs on said resilient bush engaging in said grooves.

7. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a groove in said outer bore and a rib on said resilient bush engaging in said groove, and holding means on said metal lining.

8. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a groove in said outer bore, a rib on said resilient bush engaging in said groove, and inwardly directed lugs on said metal lining.

9. Means for use in drawing-off liquids from a container, comprising a metal lining for insertion in the bung hole of the container, said lining comprising an inner bore adapted to receive a cork and an outer bore co-axial therewith, said two bores being separated by an annular rib constituting an abutment for said cork to limit outward movement thereof, a resilient bush engaging in the outer bore, said bushing comprising a sleeve portion extending into said bore, said sleeve portion comprising an annular recess formed in the thickness thereof and extending from the inner end longitudinally of said sleeve, a groove in said outer bore, a rib on said resilient bush engaging in said groove, and an outwardly directed lug on said metal lining.

FREDERICK JOHN TREVALLON BARNES.